United States Patent [19]
Edgerton

[11] 3,995,480
[45] Dec. 7, 1976

[54] THERMAL SENSOR FOR MEASUREMENT OF OCEAN CURRENT DIRECTION

[75] Inventor: Gene A. Edgerton, Ventura, Calif.

[73] Assignee: The United States of America as represented by the Secretary of the Navy, Washington, D.C.

[22] Filed: Aug. 8, 1975

[21] Appl. No.: 603,219

[52] U.S. Cl. ............................................ 73/188
[51] Int. Cl.² ................... G01P 13/00; G01W 1/00
[58] Field of Search ............... 73/170 A, 189, 188, 73/204

[56] References Cited

UNITED STATES PATENTS

| | | | |
|---|---|---|---|
| 2,728,225 | 12/1955 | Skibitzke | 73/204 |
| 2,972,885 | 2/1961 | Laub | 73/204 |
| 2,981,104 | 4/1961 | Auger | 73/189 |
| 3,352,154 | 11/1967 | Djorup | 73/189 |
| 3,359,794 | 12/1967 | Rosenberg | 73/189 |
| 3,498,127 | 3/1970 | Richards | 73/204 |
| 3,500,686 | 3/1970 | Bell | 73/204 |
| 3,604,261 | 9/1971 | Olin | 73/189 |
| 3,754,201 | 8/1973 | Adams | 73/204 X |

Primary Examiner—Herbert Goldstein
Attorney, Agent, or Firm—Richard S. Sciascia; Joseph M. St. Amand

[57] ABSTRACT

A spherical sensor having the inside thereof lined with a plurality of temperature sensing elements, multiplexing circuitry for sequentially measuring the temperature of said sensors, and a comparison circuit for determining the sensors of greater temperature to thereby derive the direction of fluid flow.

9 Claims, 4 Drawing Figures

FLOW DIRECTION

FLUID FLOW LINES AROUND A SPHERE OR CYLINDER

SCANNER AND COMPARATOR — 38
POWER SUPPLY — 44
RECORDER — 48
HEATER — 30
THERMO-CONDUCTIVE FILLER — 42
THIN FILM TEMPERATURE SENSOR — 32
Cu SENSOR HOUSING — 40

DIRECTION OF FLOW →

LOCAL HEAT TRANSFER COEFFICIENTS FOR CIRCULAR CYLINDERS AT $N_{RE}$ = 20 TO 600.

TEMPERATURE SENSORS
HEAT CONDUCTING FILLER — 42
COMMON LEAD

THERMAL SENSOR FOR MEASUREMENT OF OCEAN CURRENT DIRECTION

BACKGROUND

This invention relates to a system for measurement of the direction of flow of ocean currents. The invention relates especially to apparatus for deriving the direction of current flow in a body of water.

There are many methods of measuring both magnitude and direction of ocean currents presently available. The major problem with prior type devices is that the sensors are generally large and bulky or consume large amounts of power. The use of the thermal current sensor has been slight because it was believed that there was no inherent method for measuring direction of ocean currents.

The present system has overcome the shortcomings of prior devices and provides a small lightweight direction sensing means for readily locating the direction of flow of ocean currents. The system involves locating the stagnation point of a spherical body immersed in a fluid by using a multitude of thermosensors to measure the direction of fluid flow. The apparatus of this invention has the capability to derive current direction in three dimensions directly with low power consumption.

SUMMARY

The present invention uses a sensor having a spherical configuration for the measurement of ocean currents. A hollow spherical housing made from material that has good heat transfer characteristics has the inside thereof lined with a multitude of temperature sensing elements which are used to determine the two stagnation points on the sphere when immersed in a moving fluid. The stagnation points always align themselves with the direction of fluid flow.

Other objects, advantages and novel features of the invention will become apparent from the following detailed description of the invention when considered in conjunction with the accompanying drawings.

DESCRIPTION OF THE PREFERRED EMBODIMENTS

Figure 1:
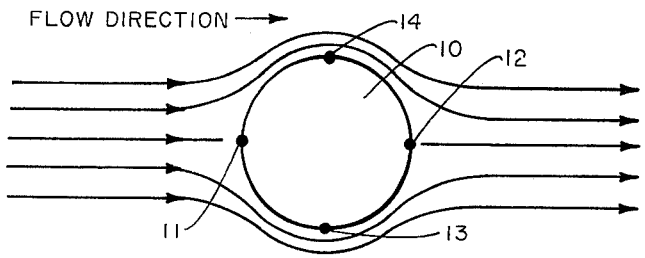
FIG. 1 is a diagram illustrating fluid flow lines about a circular cylinder or sphere and the stagnation points.

The measurement of direction of ocean current using a thermal sensor can be accomplished by using simple convective heat transfer theory. If a body (cylinder or sphere) is immersed in a moving fluid a boundary layer develops from the leading edge, or rather the stagnation point. In this boundary layer, the fluid velocity increases from zero at the surface of the body to the value of the velocity of the inviscid flow around the body. The flow in the boundary layer in the vicinity of the stagnation point is always laminar, but transition to turbulent flow may occur at some point downstream of the stagnation point. The changes in both the laminar to turbulent flow and the velocity gradient around the body cause a temperature gradient around the body. FIG. 1 shows a diagram of the fluid flow about a spherical or circular cylinder body 10. The stagnation points are shown at 11 and 12, and the points of maximum velocity are shown at 13 and 14.

Figure 2:
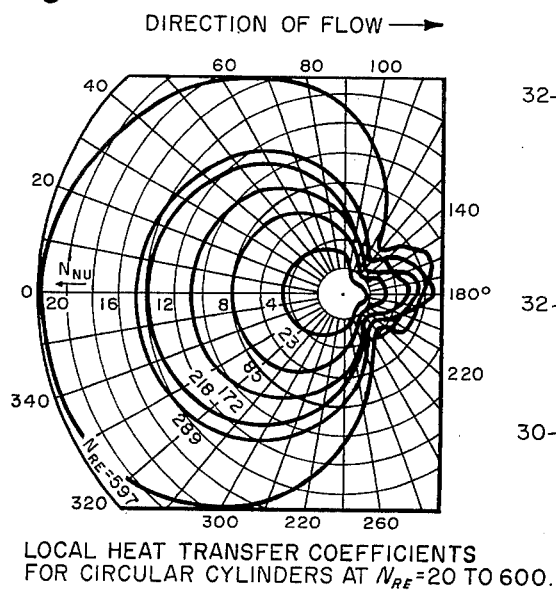
FIG. 2 shows the local heat transfer coefficients for a spherical body as in FIG. 1.

FIG. 2 shows the local heat transfer coefficients for the body 10 shown in FIG. 1. By measuring the temperature or heat transfer characteristics of the surface of the immersed body the direction of the flow of the fluid can be determined.

Therefore, by using the flow pattern characteristics of body 10 immersed in a moving fluid the flow direction of that fluid can be measured.

Figure 3:
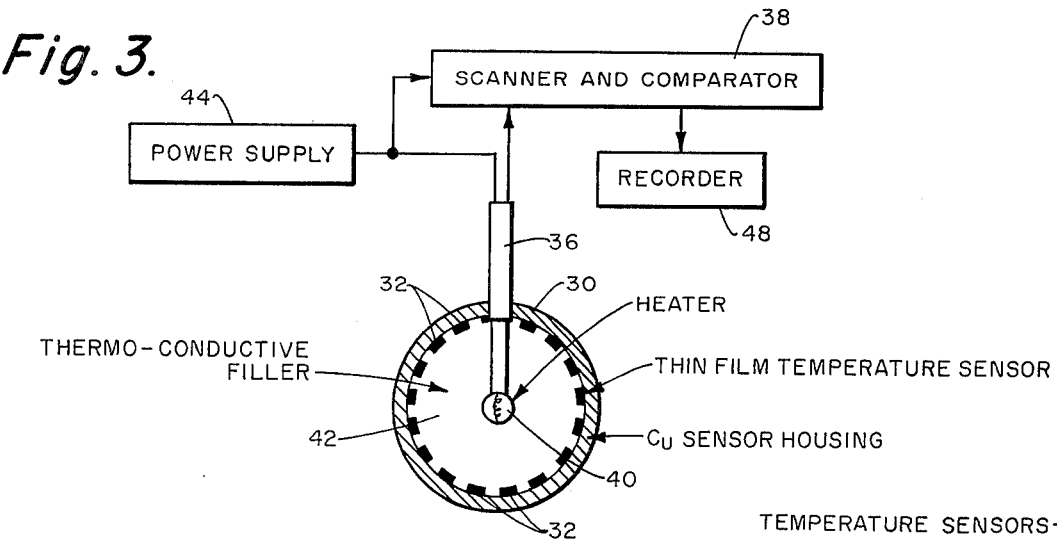
FIG. 3 is a diagrammatic illustration of a preferred embodiment of the invention showing a typical sensor configuration in cross-section and a block diagram of the circuitry of the system.

The details of the sensor construction are shown in FIG. 3. Sensor housing 30 is preferably made from copper or a CuNi alloy. The housing can be made from any suitable anti-fouling material, or coated therewith. A sphere or cylinder, one-half to one inch in diameter, is satisfactory. However the size can be varied to suit needs.

The inside surface of sensor housing 30 is lined with a multitude of temperature sensing elements 32. Spacing between sensor elements will depend upon the number of elements and lead lines used and usually range between 1 and 5 mils.

Figure 4:
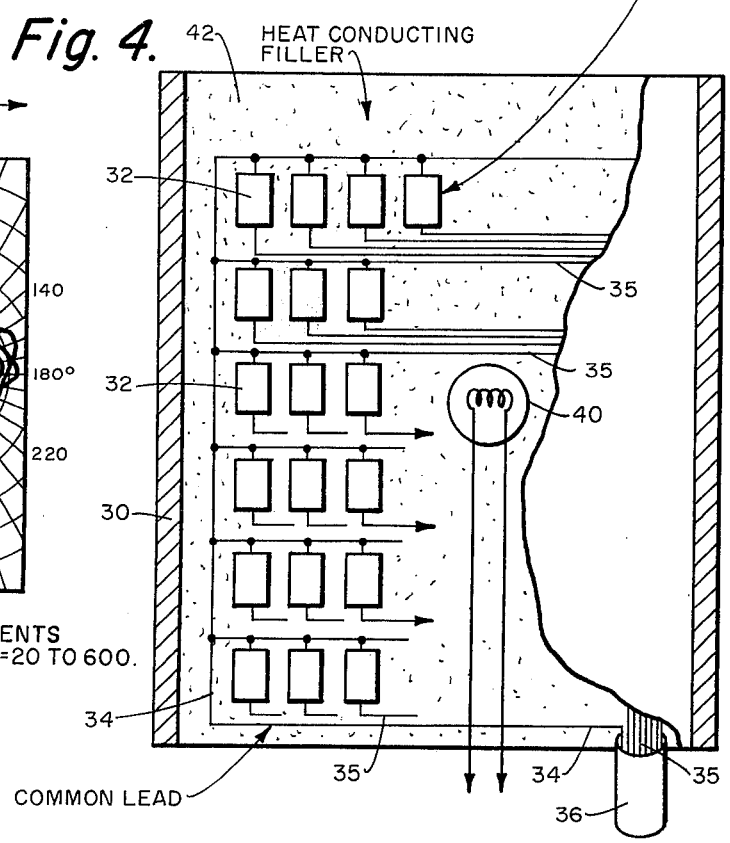
FIG. 4 is a circuit diagram showing connections for a plurality of sensor elements inside a typical thermal sensor device of the present invention.

FIG. 4 shows a circuit diagram for connection of a multitude of sensing elements 32 on the inside wall of a cylindrical housing 30. Elements 32 are preferably thin film temperature sensors produced by photoetching. Lead lines 34 and 35 may also be produced by a photo-etching process on the inside of housing 30. Sensor lead lines 34 and 35 are bundled in a sheath 36 and pass thru the wall of housing 30 to scanning and comparator 38, shown in the system circuitry FIG. 3. Electronic scanner and comparator circuit 38 samples pairs of sensor elments 180° from one another to find elements in which the temperature varies. The temperature of the various elements 32 around the sensor housing 30 will indicate the direction of the current flow by heat flux distribution. The total heat flux will also give the speed of current flow.

The temperature sensing elements 32 are thin film semi-conducting resistance elements. The electronics circuitry as shown in FIG. 3 is used to scan all the sensor elements 32 and determine which of the elements are at the greater temperature. A great number of sensors are used for direction accuracy. A heat source 40 for the sensor elements may be located in the center of the housing 30 so as to have uniform transfer characteristics. Any remaining space inside the housing is then filled with a heat conducting medium 42 such as a silver paste, for example. Heat source 40 is connected to power supply 44.

This direction sensor is small and lightweight, is an inherent part of the velocity sensor, and has the capability to resolve current direction in three dimensions directly with a small amount of power consumption. Signals from scanner and comparator circuit 38 may be fed to a recorder 48. The preferred material for sensor housing 30 is copper or CuNi but any material having good heat transfer characteristics together with a low corrosion and fouling rate can be used. The preferred sensors 32 are thin film resistance elements but any temperature sensing element whose size is compatible with the sensor housing may be used. Heat source 40 can be any heat source which acts as a point source, such as a small wire-wound resistor, for example.

Obviously many modifications and variations of the present invention are possible in the light of the above teachings. It is therefore to be understood that within the scope of the appended claims the invention may be practiced otherwise than as specifically described.

What is claimed is:

1. A thermal current sensor for the measurement of ocean currents, comprising:
    a. a hollow housing of non-corroding material having good heat transfer and low fouling rate characteristics, at least the exterior wall of said housing having an anti-fouling material thereon and having a circular cross-section;
    b. a multitude of closely spaced thin-film temperature sensing elements formed on and lining the surface of the inside wall of said housing, said sensing elements comprising an even number of elements, each pair of elements 180° opposed to each other forming a sensing unit;
    c. scanner and comparator means, said scanner and comparator means sampling the temperature of said pairs of elements 180° apart about the inside wall of said housing;
    d. a heater provided at the center of said housing for uniform heat transfer throughout said housing;
    e. the space between said heater and said elements lining the inside wall of said housing being entirely filled with a heat conducting medium;
    f. each of said temperature sensing elements being electrically connected to said scanner and comparator means for measuring the temperature of each of said sensing elements about the interior of said housing and for comparing temperature variations to thereby measure the stagnation points in a boundary layer of fluid flowing about said housing, said multitude of elements connected to said scanner and comparator being operable to detect the temperature gradient around said housing caused by both laminar-to-turbulent flow and velocity gradient of fluid flowing thereabout and thus determine the direction and speed of ocean current flow.

2. A thermal current sensor as in claim 1 wherein said housing comprises copper.

3. A thermal current sensor as in claim 1 wherein said housing comprises CuNi alloy.

4. A thermal current sensor as in claim 1 wherein said heat conducting medium is a silver paste.

5. A thermal current sensor as in claim 1 wherein said housing is cylindrical.

6. A thermal current sensor as in claim 1 wherein said elements are thin-film semi-conducting resistance elements.

7. A thermal current sensor as in claim 1 wherein said scanner and comparator means includes a power supply for said temperature sensing elements.

8. A thermal current sensor as in claim 1 wherein said spacing between sensing elements range from 1 to 5 mils.

9. A thermal current sensor as in claim 1 wherein the diameter of said housing ranges from 0.5 to 1.0 inch.

* * * * *